United States Patent [19]

Beneteau

[11] 4,135,076
[45] Jan. 16, 1979

[54] APPARATUS FOR RESISTANCE WELDING

[76] Inventor: Donald J. Beneteau, 1333 Front Rd. South, Amherstburg, Canada

[21] Appl. No.: 786,379

[22] Filed: Apr. 11, 1977

[51] Int. Cl.² .................... B23K 9/28; F15B 15/18
[52] U.S. Cl. ....................... 219/89; 60/547 R; 60/583; 60/593; 91/32; 91/448
[58] Field of Search .............. 91/4, 32, 189, 448, 91/450, 459, 6; 137/596, 596.17; 60/560, 583, 593, 547; 219/89

[56] References Cited

U.S. PATENT DOCUMENTS

| | | | |
|---|---|---|---|
| 2,825,306 | 3/1958 | Buri | 91/450 |
| 3,497,660 | 2/1970 | Henry-Biabaud | 219/89 |
| 3,802,318 | 4/1974 | Sibbald | 91/32 |
| 3,875,365 | 4/1975 | Beneteau | 60/560 |

*Primary Examiner*—Martin P. Schwadron
*Assistant Examiner*—Abraham Hershkovitz
*Attorney, Agent, or Firm*—Allen D. Gutchess, Jr.

[57] ABSTRACT

Apparatus and controls are provided for resistance welding one workpiece or body to another. A movable electrode is driven by a cylinder and a piston which are positioned in tandem with a second cylinder and a second piston. The design enables a small pressure applied to the second piston to result in a large force applied by the electrode to the bodies to be welded, with a back-up electrode located on the opposite side of the bodies. Controls for the apparatus enable the force applied by the movable electrode to the bodies to be changed almost instantaneously so that the force applied can be raised and lowered during the actual resistance welding cycle. In some intances, by way of illustration, the pressure is raised while the welding current is on, and, in other instances, the force is decreased and then increased again during the welding cycle.

6 Claims, 6 Drawing Figures

APPARATUS FOR RESISTANCE WELDING

This invention relates to resistance welding apparatus and to controls therefor.

The apparatus according to the invention includes a movable electrode driven by tandem hydraulic and pneumatic cylinders and pistons. These tandem cylinders are basically disclosed in my U.S. Pat. No. 3,875,365. The controls include valves and pressure regulators designed and arranged so that the pressure of the gas or fluid in the pneumatic cylinder above the second piston can be changed substantially instantaneously whereby the force of the electrodes on the bodies to be welded can be changed during the actual resistance welding cycle. By way of example, when resistance welding aluminum bodies, an initial force of 1200 pounds can be applied to the bodies through the movable electrode and then increased to 1800 pounds as the welding current continues to be applied. This achieves more consistent welds and longer electrode life. In another example, in welding certain steel frames, the initial force applied by the electrodes is 4000 pounds at which time the bodies are preheated to a temperature of 1000°–1100° F. The electrode force is then decreased to 3000 pounds and the resistance welding current is initiated. The decrease in the electrode force minimizes the electrode indentation of the bodies and also enables the use of less power. The force of the electrodes is then increased again to 4000 pounds and the welding current is stopped for ½ second. The current is then turned on again to anneal the welded "nugget" while the latter force is maintained.

The almost instantaneous increase or decrease and even another increase in electrode force are achieved by a combination of valves and regulators along with the small volumes of air required to achieve the substantially instantaneous change in force during the actual welding cycles.

It is, therefore, a principal object of the invention to provide improved resistance welding apparatus and controls therefor.

Another object of the invention is to provide an improved drive arrangement and controls for a movable welding electrode.

Yet another object of the invention is to provide apparatus and controls for resistance welding which enables the electrode force to be almost instantaneously changed during the welding operation.

Many other objects and advantages of the invention will be apparent from the following detailed description of a preferred embodiment thereof, reference being made to the accompanying drawings, in which.

Figures 1, 2:
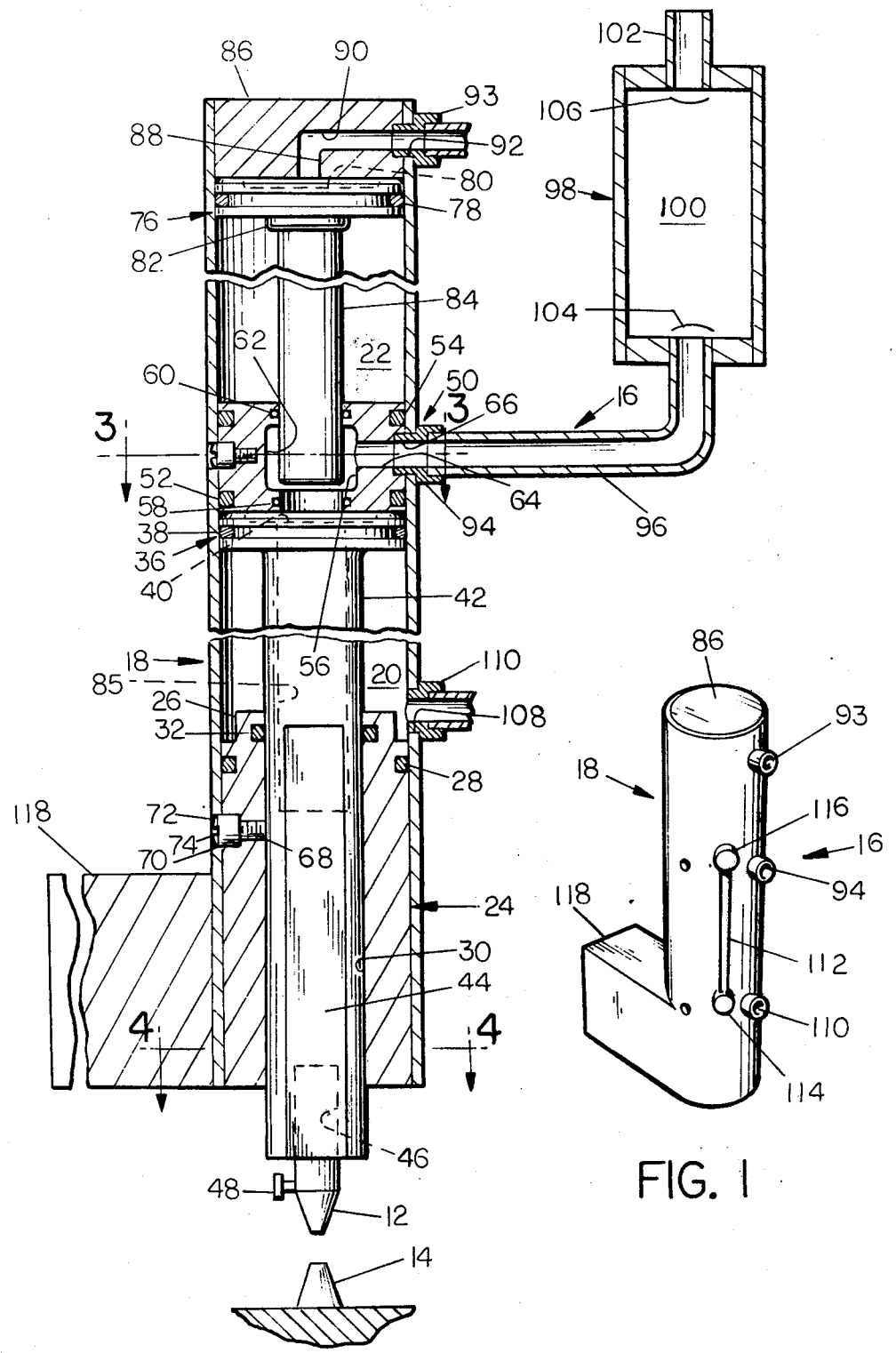
FIG. 1 is a view in perspective of apparatus embodying the invention.
FIG. 2 is an enlarged, fragmentary view in vertical cross section taken through the apparatus of FIG. 1.

Referring to FIGS. 1 and 2, apparatus for resistance welding bodies is indicated at 10. The apparatus includes a movable electrode 12, a back-up electrode 14, a drive unit 16, and the controls of FIG. 5. The electrodes are basically of a known design.

Figures 3, 4:
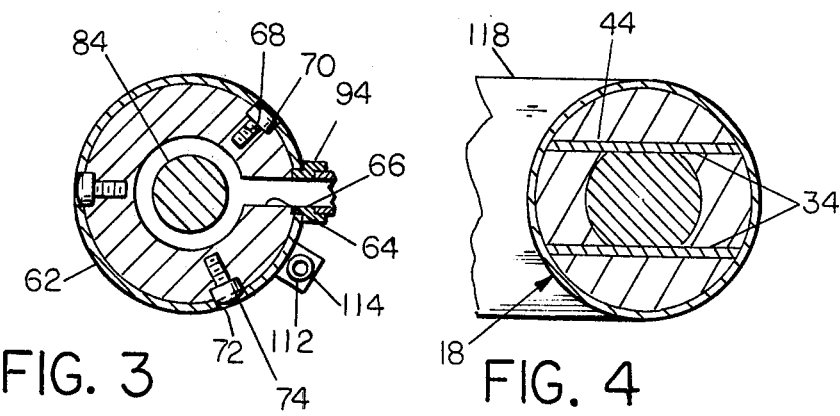
FIG. 3 is a view in transverse cross section taken along the line 3—3 of FIG. 2.
FIG. 4 is a view in transverse cross section taken along the line 4—4 of FIG. 2.

The drive unit 16 has a cylindrical housing 18 which forms a first cylindrical chamber 20 and a second cylindrical chamber 22. The lower end of the first cylindrical chamber 20 is defined by a plug or block 24 which has a smaller diameter neck 26 and an intermediate outer seal 28 engaging the inner surface of the housing 18. The block 24 also has a central cylindrical bore 30 extending therethrough with a seal 32 near the upper end thereof in the neck 26. Referring also to FIG. 4, the lower end of the bore 30 has two bars 34 affixed in grooves in the end of the block 24.

A piston 36 is located within the first chamber 20 and has an annular seal 38 and an upper, shallow recess 40. A piston rod 42 is connected to the piston 36 and extends out of the chamber 20 through the bore 30. The piston rod 40 has two flats 44 along a lower portion thereof which cooperate with the bars 34 to prevent rotation of the piston rod and also to guide it. The upper, cylindrical portion of the piston rod 42 cooperates with the seal 32 at all times, for any position of the piston 34, to provide a seal at the lower end of the chamber 20. The lower end of the piston rod has a central recess 46 in which the electrode 12 is held but is electrically isolated therefrom. The electrode has a terminal 48 to which a welding current cable is connected.

An intermediate plug or block 50 separates the chambers 20 and 22, defining the upper end of the lower chamber 20 and the lower end of the upper chamber 22. The block 50 has outer lower and upper seals 52 and 54 which engage the inner surface of the housing 18. The block also has a central cylindrical bore 56 with inner lower and upper seals 58 and 60. At an intermediate portion of the bore 56 is an annular chamber 62 communicating with a supply passage 64 which is aligned with a port 66 in the housing 18.

The blocks 24 and 50 are secured in the housing 18 by the same means, as shown in FIG. 3. Each of the blocks has three tapped recesses 68 communicating with outer, larger diameter recesses 70 at the surfaces thereof. The latter recesses are aligned with openings 72 in the cylindrical housing 18 and Allen head screws 74 are threaded into the tapped recesses 68. The heads of the screws are partly received in the recesses 70 and partly received in the holes 72 of the housing 18, the heads having a tight fit in the holes 72 to securely position the blocks in the housing. This mounting arrangement for the blocks also minimizes the possibility of distorting the housing 18 when the blocks are fastened in place.

A second piston 76 is located in the upper chamber 22 and has an annular seal 78 therearound, an upper shallow recess 80, and a lower, downwardly-extending shoulder portion 82. A cylindrical piston rod 84 extends downwardly from the piston 76 into or through the bore 56 and is at all times in contact with the inner, upper seal 60 to provide a seal at the lower end of the chamber 22. In a lower position, the piston rod 84 is also in contact with the lower inner seal 58 to seal off the annular chamber 62 and the upper end of the lower chamber 20. The lower piston 36 has a deep central recess or cavity 85 opening at the upper end into which the piston rod 84 can extend, although ordinarily, the lower end of the piston rod 84 will not reach the piston 36.

An upper plug or block 86 can be affixed by the screws 74 or silver soldered in the upper end of the housing 18 and defines the upper end of the chamber 22. The block 86 has a central recess 88 which communicates with a threaded transverse bore 90, a port 92 in the housing 18, and a fitting or nipple 93.

Hydraulic liquid, such as oil, under pressure is supplied to the annular chamber 62 and to the upper end of the chamber 20. For this purpose, a nipple 94 is aligned with the port 66 and is affixed to the housing 18. A tube 96 is connected to the nipple 94 and communicates with a cylindrical housing 98 forming a gas-liquid, specifically air-oil, chamber 100. The upper end of the housing has a supply line 102 through which gas, specifically air, is supplied to the chamber 100 with the tube 96 and the line 102 having baffles 104 and 106 which prevent oil entering the air line and air entering the oil line.

To return the pistons 36 and 76 to their upper positions, as shown, from lower positions, the chamber 20 has a lower return air port 108 which communicates with the lower annular portion of the chamber 20 around the block neck 26. A nipple 110 is aligned with the port 108 and is affixed to the cylindrical housing 18. Return air for the upper chamber 22 is supplied from the lower chamber 20. For this purpose, as shown in FIG. 1, the housing 18 has a tube 112 extending from a fitting 114 communicating with the lower end of the lower chamber 20 to a fitting 116 communicating with a lower end of the upper chamber 22.

The unit must be held rigidly by the welding machine in order to obtain the desired accuracy. Accordingly, a solid, thick, rigid, mounting bar 118 is affixed to a lower portion of the housing 18 and extends outwardly perpendicular thereto. The mounting bar extends from the bottom edge of the housing up near the mounting holes 66 in the housing for the Allen head screws 74. This dimension can be increased for additional rigidity if desired. However, the mounting bar 118 preferably has a horizontal width not exceeding the diameter of the housing 18, as shown particularly in FIG. 1. This enables the units 16 to be placed in side-by-side relationship with the outer surfaces of the housings 18 tangential, if desired. Thus, maximum versatility in the placement of the drive units 16 is achieved with this design.

In the operation of the drive unit 16, the pistons 36 and 76 initially are at the upper ends of the chamber 20 and 22. Air is then supplied through the line 102 to the chamber 100 causing oil therein to move under pressure through the tube 96, the port 66, the passage 64, and the annular chamber 62. From here it flows through the lower portion of the bore 56 into the upper end of the chamber 20 on the side of the piston 36 opposite the piston rod 42. This oil forces the piston 36 downwardly until the electrode 12 comes into contact with the upper surface of the bodies to be welded. When the pressure in the upper portion of the chamber 20 reaches a given value, gas, specifically air, under pressure is supplied through the fitting 93, the port 92, the threaded bore 90, and the central recess 88 into the upper chamber 22. This air forces the piston 76 downwardly, and when the piston rod 84 contacts the lower seal 58, oil flow is prevented and the oil in the upper portion of the chamber 20 is trapped. As the piston rod 84 moves into the chamber 20, the trapped oil forces the piston 36 downwardly under high pressure and at a slower rate than the movement of the piston rod 84 and the piston 76. The force applied by the electrode 12 to the bodies is accordingly also multiplied so that, by way of illustration, with oil at a pressure of 100 psi, the force of the electrode 12 on the workpiece can be 4000 pounds with the housing 18 having a 2½ inch inner diameter.

When the welding is completed, the return fluid, specifically air, is supplied to the lower ends of the chambers 20 and 22 to move the pistons 36 and 76 back to the upper portions of the chambers, as shown. At this time, the oil is forced back through the tube 96 of the cylinder 98, with air in the chamber 100 being vented.

Ordinarily in resistance welding, the movable electrode is simply brought against one of the bodies to be welded and constant force is then maintained through the electrodes to the bodies as the welding current is applied. With the apparatus according to the invention, however, the amount of force supplied to the bodies by the electrodes during the welding cycle can be raised or lowered to produce beneficial effects. Thus, for example, when welding aluminum bodies, the initial force on the bodies by the electrodes can be increased as the welding current continues to be applied. This has been found to achieve more consistent welds and also longer electrode life. In another resistance welding operation, the force applied by the electrodes is decreased and subsequently increased again. The bodies are preheated when the initial force is applied and the resistance welding current is then initiated after the electrode force is decreased. Finally, the current is stopped briefly after the force is increased again and is then turned on once more to anneal the welded "nugget". This cycle has been found to minimize electrode indentation of the bodies, enable the use of less power, and also achieve the annealing.

Figure 5:
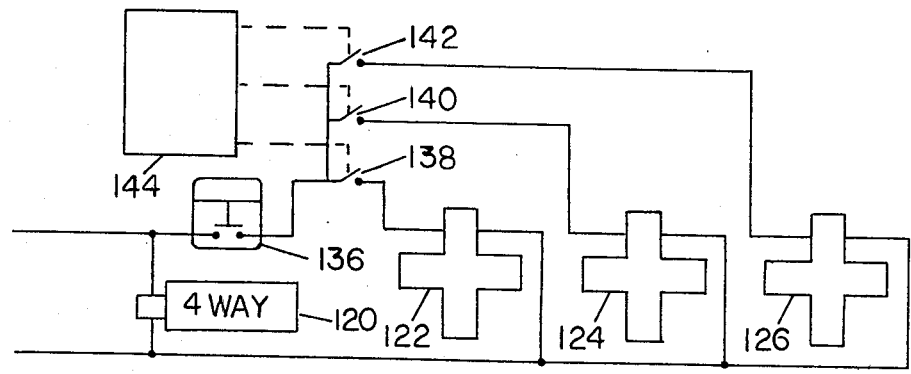
FIG. 5 is a diagrammatic view of an electrical circuit used with the apparatus.
Figure 6:
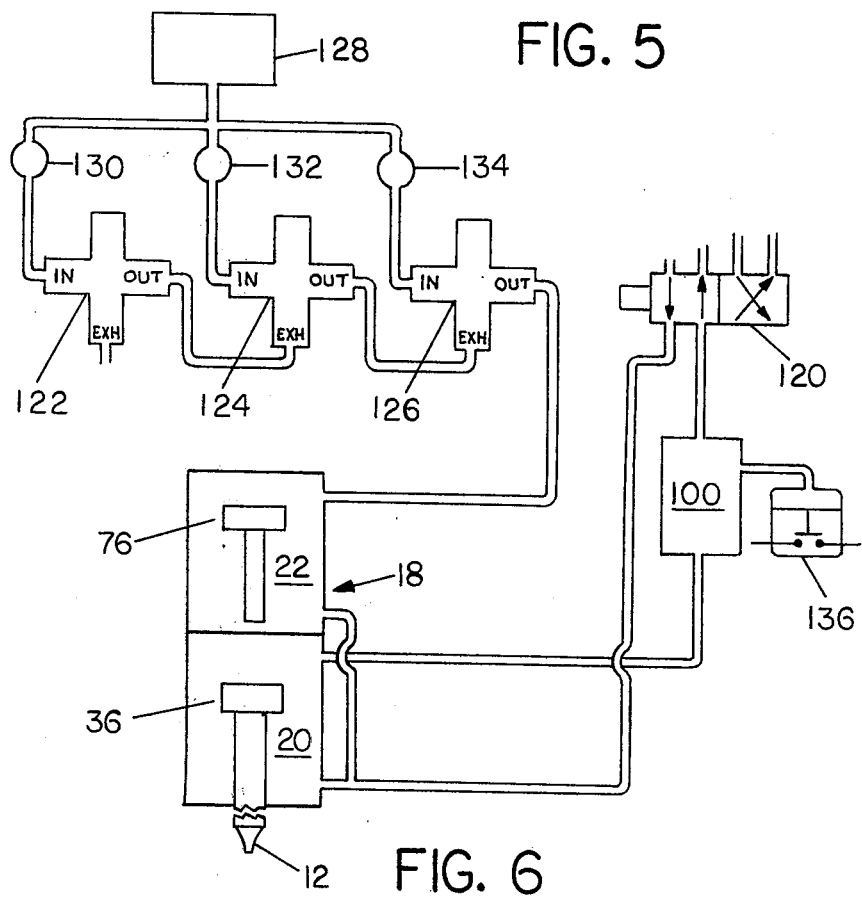
FIG. 6 is a diagrammatic view of pneumatic controls used with the circuit of FIG. 5.

Referring to FIGS. 5 and 6, a four-way valve 120 controls the supply of air to and from the air-oil chamber 100 and the lower portions of the chambers 20 and 22. When in its unactuated position, as shown, the valve 120 supplies the return air to the chambers 20 and 22 and exhausts the air from the air-oil chamber 100 so that the pistons 36 and 76 are in their upper positions, as shown in FIG. 2. When the valve 120 is actuated, it supplies air to the chamber 100 and vents return air from the lower chambers 20 and 22. This causes the electrode 12 to move down against the bodies to be welded with a force determined by the pressure of the air and oil in the chamber 100.

The gas supply for the upper end of the chamber 22 is controlled by three solenoid-operated, three-way valves 122, 124, and 126. When each of the three-way valves 122-126 is not actuated, the out port communicates with the exhaust port. When each of the valves is actuated, the out port communicates with the in port. The valves are connected to a common source 128 of gas, and specifically air, under pressure through commercially-available dumping regulators 130, 132, and 134. These regulators maintain a given air pressure downstream and if the air downstream should be at a higher pressure than that set at the regulator, the regulator exhausts the downstream air until the set pressure is reached. The solenoid-operated, three-way valves 122, 124, and 126 can only be actuated when a pressure switch 136 is closed, this being closed when air supplied to the air-oil chamber 100 reaches a predetermined pressure. The pressure switch 136 is in series with three sets of contacts 138, 140, and 142 which are actuated by commerically-available resistance welding controls indicated at 144. The contacts 138-142 are normally open but can be closed at any time and in any sequence during the resistance welding cycle by the controls 144.

In operation, when the four-way valve 120 is actuated, as by a start switch, for example, the valve directs air under pressure to the air-oil chamber 100 and vents the return air from the lower portions of the chambers 20 and 22. The electrode 12 then moves down against one of the bodies to be welded. With the three-way valves 122, 124, and 126 unactuated, the air in the upper portion of the chamber 22 is exhausted or vented through the exhaust port of the valve 122 which communicates with the chamber 22 through the unactuated valves 124 and 126.

As the air pressure in the chamber 100 rises, the contacts of the pressure switch 136 close, to ready the valves 122, 124, and 126 for operation when any of the contacts 138, 140, and 142 are closed by the welding controls 144. With the regulator 130 set for 80 psi pressure, for example, and the valve 122 actuated, air at 80 psi will be supplied through the exhaust and out ports of the unactuated valve 124 and the exhaust and out ports of the unactuated valve 126 to the upper portion of the chamber 22. The piston 76 is then forced downwardly to trap the oil in the upper portion of the chamber 20 and to further increase the force of the electrodes 12 and 14 on the bodies. With the regulator 132 set for 60 psi pressure, for example, and the valve 124 actuated, the air in the upper portion of the chamber 22 will then drop to 60 psi since the regulator 132 will immediately exhaust air from the valve 124 through the regulator down to 60 psi. At this time, it is immaterial whether the valve 122 is actuated since the exhaust port of the valve 124 does not communicate with any other port. The relationship between the valves 124 and 126 will be similar if the valve 126 is actuated. Thus, if the regulator 134 is set at 40 psi, for example, it will immediately exhaust air down to that pressure when the valve 126 is actuated.

To raise the pressure in the chamber 22 from 40 to 60 psi, for example, the three-way valve 124 is actuated with the valve 126 unactuated. The pressure downstream of the regulator 132 will be 60 psi and this pressure will be immediately applied to the chamber 22 through the exhaust and out ports of the unactuated valve 126. The fact that the volumes of air involved for the chamber 22 are small, enables the pressure change to be almost instantaneous, fast enough so that the changes can be effected during the resistance welding cycle. The small volumes of air enable the pressure to be quickly raised from one value to another through the appropriate supply regulator, and, similarly, the small volumes enable the pressure in the chamber 22 to be almost instantaneously decreased by exhausting small volumes of air through the appropriate regulator.

It will be readily understood that wide variations can be achieved in welding cycles and pressures with the apparatus according to the invention. By way of illustration, however, for welding aluminum bodies, the valve 126 can be actuated through the contacts 142 to apply air pressure in the chamber 22 sufficient to produce an electrode force of 1200 pounds to the bodies as the resistance welding current is supplied through the electrodes. Subsequently, the valve 126 is unactuated and the valve 124 simultaneously actuated to now supply air under higher pressure to the upper portion of the chamber 22 to cause an increase in the electrode force of the aluminum bodies to 1800 pounds. This force is then held until the welding current is stopped. This pressure rise during the welding cycle has been found to achieve both more consistent welds and a longer electrode life.

By way of another example, when welding heavy steel frames together, the three-way valve 122 can be actuated to supply high pressure air to the chamber 22 and cause an electrode force, after the electrode 12 is moved initially against the bodies by the pressure of the oil, to be 4000 pounds. With this force, current is supplied through the electrodes to preheat the bodies to 1000°–1100° F. The valve 124 is then actuated to cause the regulator 132 to vent the air pressure to a lower figure of 60 psi and this causes the electrode force to decrease to 3000 pounds. At this time, the main welding current is supplied through the electrodes. After a period of time, the valve 124 is unactuated and the valve 122 either remains actuated or is actuated again to supply the higher pressure air and increase the force of the electrodes to 4000 pounds again. At this time, the welding current is stopped for a brief period, as ½ second, and is then turned on again to cause annealing of the weld "nugget" of the welded bodies. This double change in pressure and electrode force minimizes the electrode indentation on the bodies being welded and results in the use of less power, in addition to annealing the weld.

Various modifications of the above-described preferred embodiment of the invention will be apparent to those skilled in the art, and it is to be understood that such modifications can be made without departing from the scope of the invention, if they are within the spirit and the tenor of the accompanying claims.

I claim:

1. Apparatus for resistance welding a first body to a second body, said apparatus comprising means forming a first chamber, a first piston in said chamber, a first piston rod connected to said first piston and extending out of said chamber, an electrode affixed to an end of said piston rod, means forming a second chamber, a second piston in said second chamber, a second piston rod connected to said second piston and extendable into said first chamber, a source of gas under pressure, a first regulator for regulating the gas at one pressure, a second regulator for regulating the gas at a second pressure different from the first pressure, a first three-way valve having an in port, an out port, and an exhaust port, with the out port communicating with the exhaust port when the first valve is not actuated and the out port communicating with the in port when the first valve is actuated, a second three-way valve having an in port, an out port, and an exhaust port, with the out port communicating with the exhaust port when said second valve is not actuated and the out port communicating with the in port when said second valve is actuated, first passage means connecting the out port of said first valve with said second chamber on the side of said second piston opposite said second piston rod, second passage means connecting the exhaust port of said first valve with the out port of said second valve, third passage means connecting the in port of said first valve with said first regulator, and fourth passage means connecting the in port of said second valve with said second regulator, said first regulator supplying gas under the one pressure to said second chamber when said first valve is actuated, said second regulator supplying gas under the second pressure to said second chamber when said second valve is actuated and said first valve is not actuated.

2. Apparatus according to claim 1 characterized by means for supplying fluid under pressure to both of said first and said second chambers on the sides of said first and said second piston having said first and said second piston rods.

3. Apparatus according to claim 1 wherein both of said regulators are dumping regulators.

4. Apparatus according to claim 1 characterized by a third regulator for regulating the gas at a third pressure different from the first and second pressures, and a third valve communicating with said third regulator for supplying gas under the third pressure to said second chamber on the side of said second piston opposite said second piston rod when said third valve is actuated and said first and second valves are not.

5. Apparatus for resistance welding a first body to a second body, said apparatus comprising means forming a first chamber, a first piston in said first chamber, a first piston rod connected to said first piston and extending out of said chamber, an electrode affixed to an end of said piston rod, means forming a second chamber, a second piston in said second chamber, a second piston rod connected to said second piston and extendable into said first chamber, first passage means for directing liquid to said first chamber on the side of said first piston opposite said first piston rod, second passage means for directing gas to said second chamber on the side of said second piston opposite said second piston rod, third passage means for directing fluid to said first and second chambers on the sides of said first and second pistons having said first and second piston rods, a source of gas under pressure, first regulator means for regulating the gas at one pressure, second regulator means for regulating the gas at a second pressure different from the first pressure, third regulator means for regulating the gas at a third pressure different from the first and second pressures, first, second, and third three-way valves, each having an in port, an out port, and an exhaust port, with the out port communicating with the exhaust port when the valve is not actuated and the out port communicating with the in port when the valve is actuated, fourth passage means connecting the out port of said first valve with said second passage means, fifth passage means connecting the exhaust port of said first valve with the out port of said second valve, sixth passage means connecting the exhaust port of said second valve with the out port of said third valve, seventh passage means connecting the in port of said first valve with said first regulator means, eighth passage means connecting the in port of said second valve with said second regulator means, and ninth passage means connecting the in port of said third valve with said third regulator means, said first regulator means supplying gas under the one pressure to said second chamber when said first valve is actuated, said second regulator means supplying gas under the second pressure to said second chamber when said second valve is actuated and said first valve is not and said third regulator means supplying gas under the third pressure to said second chamber when said third valve is actuated and said first and second valves are not.

6. Apparatus according to claim 5 wherein all three of said regulator means are dumping regulators.

* * * * *